United States Patent Office 3,303,020
Patented Feb. 7, 1967

3,303,020
PROCESS FOR THE REMOVAL OF A PLATINUM GROUP METAL FROM AN ORGANIC REACTION PRODUCT
William H. Clement, Cincinnati, Ohio, and Charles M. Seiwitz, Pitcairn, Pa., assignors to Gulf Research & Development Company, Pittsburgh, Pa., a corporation of Delaware
No Drawing. Filed Oct. 21, 1963, Ser. No. 317,815
16 Claims. (Cl. 75—83)

This invention relates to the preparation of carbonyl compounds by the oxidation of olefinically unsaturated compounds having at least six carbon atoms per molecule and, more particularly, to the recovery of the platinum group metal catalyst used in the reaction.

In recent years the so-called "Consortium" or Wacker process has been developed for the preparation of carbonyl compounds by the oxidation of ethylenically unsaturated hydrocarbons and, in particular, for the preparation of acetaldehyde from ethylene. The Consortium process is described, for example, in "Catalytic Reactions of Olefins on Platinum Metal Compounds" Angewandte Chemie 71, 176–182 (1959). In the Consortium process acetaldehyde is prepared by contacting ethylene with an oxygen containing gas in the presence of a compound of a metal of the platinum group and an oxidizing agent having an oxidation potential higher than that of the platinum group metal. The usual catalyst and oxidizing agent are palladium chloride and copper chloride, respectively. When the lower molecular weight olefins are employed as the charge stock, such as for example, ethylene and propylene, they enter the reaction in the gaseous phase and unreacted olefins and the desired carbonyl containing compounds leave the reaction zone in the gaseous phase. Thus, for the lower molecular weight olefinically unsaturated charge stocks, the separation of the carbonyl containing compounds from the reaction catalyst is an easy matter. When the olefinically unsaturated charge stock contains olefins having at least six carbon atoms per molecule, the charge stock and product are in the liquid phase and when the catalyst is in a form soluble in the reaction medium a portion of the catalyst is removed in the product phase and it is difficult to recover substantially all of the catalyst. Due to its expense it is important in achieving a commercially acceptable process to recover even small amounts of a platinum group metal catalyst from the product. Attempts have been made unsuccessfully to recover substantially all of the platinum group metal catalyst from a reaction product by various means, such as distillation, extraction with dimethyl sulfoxide and aqueous hydrochloric acid, but, in each case, only a portion of the platinum group metal was recovered. It was found, however, that substantially all of the copper oxidation agent was recoverable by the HCL extraction technique. It is an object of the present invention to easily and quickly recover substantially all of the platinum group metal compound catalyst from an organic reaction product as the free metal. The free metal can then, if desired, be reconverted to a reaction soluble metal salt.

In accordance with the invention, a platinum group metal is recovered substantially completely from an organic reaction product by a process which comprises contacting the organic reaction product with a solid inert material at a temperature of at least 125° C. but less than the decomposition temperature of the reaction product for a time sufficient to precipitate the platinum group metal as the free metal while maintaining the reaction product in the liquid phase. The platinum group metal is present in the reaction product before contacting with the solid inert material in a form which is soluble but only a part of which is extractable with an aqueous mineral acid.

In one embodiment of the invention, the platinum group metal compound is recovered substantially completely from a reaction product formed by the oxidation of an olefinically unsaturated compound having at least six carbon atoms per molecule and at least one hydrogen atom on each carbon atom of at least one olefinic double bond in the presence of a water soluble platinum group metal compound partially extractable from the reaction product with an aqueous mineral acid by a process which comprises contacting said reaction product with a solid inert material at a temperature of at least 125° C. but less than the decomposition temperature of said reaction product for a time sufficient to precipitate the platinum group metal as the free metal while maintaining said reaction product in the liquid phase.

In one preferred embodiment of this invention, a platinum group metal is recovered substantially completely in a continuous manner from a reaction product formed by continuously adding an olefinically unsaturated compound having at least six carbon atoms per molecule and at least one hydrogen atom on each carbon atom of at least one double bond at a rate equivalent to the rate of reaction of the olefinically unsaturated compound, and continuously adding an oxygen containing gas to the lower phase of a reaction mixture comprising an aqueous solution of a compound of a metal of the platinum group, an oxidizing agent having an oxidation potential higher than that of the platinum group metal and a solvent which has a dielectric constant at 25° C. of at least 20 and is such that between 0.5 and 1.5 volumes of dodecene-1 are soluble at a temperature of 25° C. in a mixture of 50 volumes of solvent and 7 volumes of water, continuously removing an upper phase containing said reaction product comprising unreacted olefin, solvent, carbonyl containing compounds, and at least a portion of the platinum group metal compound, continuously contacting said upper phase with a solid inert material at a temperature of at least 125° C. but less than the decomposition temperature of said reaction product for a time sufficient to precipitate substantially all of said platinum group metal as the free metal on said solid inert material while maintaining the reaction product in the liquid phase.

In yet another embodiment of this invention the oxidizing agent is a soluble metal compound, the metal portion of which has an oxidation potential higher than that of the platinum group metal; and said metal compound oxidizing agent is recovered along with the platinum group metal compound by contacting the reaction product with an inert solid material at a temperature of at least 125° C. but less than the decomposition temperature of said reaction product for a time sufficient to precipitate said platinum group metal and said oxidizing agent as the free metals on said solid inert material while maintaining the reaction product in the liquid phase.

In yet another embodiment of this invention, the platinum group metal compound and the metal compound oxidizing agent are in the form of metal halides and are recovered from the inert solid material together by contacting the inert solid material with an acid halide corresponding to the desired metal halide.

Any solid inert material can suitably be used for deposition of the platinum group metal compounds. By an inert solid material is meant a solid material which does not promote a catalytic reaction of the components of the reaction product mixture. Examples of suitable solid inert materials include quartz chips, beryl saddles, pumice, glass, Raschig rings, carbon granules and alpha-alumina (corundum). The solid inert material is suitably in small pieces such as chips or granules packed in a column, and the reaction product mixture can be passed upflow or downflow through the packed bed at an elevated temperature. The platinum group metal compound and other metal compounds in the reaction product mixture deposit as the free metal on the solid inert packing as the mixture proceeds through the bed, and the metal compounds decompose. It is also preferred that the solid inert material be inert to any regeneration gases to be employed.

The temperature of the reaction product during contacting with the inert solid material must be at least 125° C. to cause deposition of the platinum group metal compound on the inert support. It is preferred that the temperature be slightly below (about 5°–10° C. below) the boiling point of the product at reaction pressure. The temperature should not be so high as to cause decomposition of the ketone. Decomposition of the carbonyl containing products occurs at temperatures of about 400° C. The temperature can therefore vary between about 125° and 400° C. The preferred temperatures are between 180° and 240° C.

The function of pressure in the recovery process of this invention is to maintain the reaction products substantially in the liquid phase to act as a wash liquid to maintain the solid inert material substantially free of any polymers which may form. Atmospheric pressure is generally satisfactory in most cases; however, higher pressures of about 200 p.s.i.g. or higher may be employed, if desired.

The space velocity should be such as to allow sufficient contact time for the platinum group metal to deposit on the inert material. Space velocity and temperature, however, are interdependent and a higher decomposition temperature would require a higher space velocity. In general, the space velocity can vary between 0.01 and 40.0 liquid volumes of reaction product per volume of reactor space per hour with preferred space velocities being between 0.05 and 2.0. The space velocity will also vary depending upon the amount of metal compounds in the reaction product with the lower space velocities being required with the higher concentration of metal compounds.

After the metals are deposited, the remaining portion of the oxidation product can be swept out of the deposition zone by any suitable means. One such means, for example, would be the use of an inert organic liquid with good solvent properties and which is easily separable by distillation, for example, from the oxidation product. Examples of suitable liquids include pentane, acetone, methanol, benzene and chloroform.

The platinum group metal compound can then be removed from the inert material by any suitable means. One suitable means comprises dissolving the platinum group metal compound in aqua regia which can be passed through the column of inert material.

Another suitable method would be to pass elemental chlorine through the packed bed at elevated temperatures and thereafter to leach out the platinum group metal halide with a suitable solvent such as methanol. This method is particularly advantageous since a solvent, such as methanol, ethanol, dimethylformamide and acetamide can be employed to leach out the metal chloride and then serve as the solvent reaction medium for the olefin oxidation reaction.

Still another suitable method would be to fill the packed bed with an aqueous or methanol-water solution of hydrochloric acid followed by passage of air or oxygen through the system to convert the platinum group metal to the chloride form.

The charge stock can be any olefinically unsaturated compound having at least six carbon atoms per molecule and which has at least one hydrogen atom on each carbon atom of at least one olefinic double bond. The charge stock is preferably an olefinically unsaturated compound which has between 6 and 40 carbon atoms per molecule and more preferably between 6 and 20 carbon atoms per molecule. In addition, the preferred charge stocks are the olefinically unsaturated hydrocarbons havings between 1 and 4 olefinic double bonds. The more preferred charge stocks are the aliphatic monoolefinic hydrocarbons having between 6 and 20 carbon atoms per molecule. The most preferred charge stocks are the aliphatic alpha monoolefinic hydrocarbons having between 6 and 20 carbon atoms per molecule. Suitable specific examples of olefinic unsaturated compounds include hexene1; heptene-1; octene-1; nonene-1; decene-1; undecene-1; dodecene-1; tridecene-1; tetradecene-1; pentadecene-1; hexadecene-1; heptadecene-1; octadecene-1; nonadecene-1; eicosene-1; heneicosene-1; docosene-1; tricosene-1; tetracosene-1; pentacosene-1; hexacosene-1; heptacosene-1; octacosene-1; nonacosene-1; triacontene-1; heptriacontene-1; dotriacontene-1; tritriacontene-1; tetratriacontene-1; nonene-3; decene-4; 7-methyldecene-2; 7-methyldecene-1; 6,9-diethylundecene-1; 5,7-dimethyldodecene-1; 4,7,9-trimethyltridecene-1; 5-butyltetradecadiene-1,5; 8-phenylpentadecene-1; 7-cyclohexylhexadecene-1; 11(alpha-cumyl)heptadecene-1; 6-butyloctadecadiene-1,11; 5-(2-norbornyl)nonadecene-1; 6 - ethyleicosene-1; 8-t-butyltricosene-1; 7-phenyldocosene-1; 4-methyloctene-1; 4-methylpentadecene-1; 5-methylpentadecene-1; 8-methylpentadecene-1; 9-methylpentadecene-1; 10-phenylpentadecene-1; 10-cyclohexyldecene-1; 10-cyclooctyldecene-1; 4,5,6,7-tetramethyloctene-1; 4,6,7-trimethyldecene-1; 4,6,7-trimethyldodecene-1; 7-hydroxyoctene-1; 9-chlorononene-1; 5-methoxydecene-1; 7,11-diphenylundecene-1; 11-dodecen-1-al; 8-ketotridecene-1; 9-aminotetradecene-1; 14-cyanopentadecene-1; 10-undecenoic acid; 15-n-hexadecenoic acid; isooctyl 16-heptadecenoate; 12-(alpha-cumyl) octadecene-1; 14-ketononadecene-1; 20-N-acetoxyaminoeicosene-1; 17,18-dinitroheneicosene-1; 22-p-tolyldocosene-1; 20-(b-thieno)tricosene-1; 20-(alpha-naphthyl)tetracosene-1; 12-keto-23-triapentacosene-1; 12-hydroxyhexacosene-1; 17-bromoheptacosene-1; 28-cyanooctacosene-1; 20-acetoxynonacosene-1; 18-butoxytriacontene-1; 9-mercaptohentriacontene-1; 30-thiadotriacontene- 1; 30-oxatritriacontene-1; 24-azatetratriacontene-1; 4-trimethylsilylhexene-1; 1,2-epoxyheptene-6; 2-(7-methyl-11-decenyl)-1,4-benzoquinone; 10,11-difluoro-6,9-diethylundecene-1; 5,7-dimethyl-6-oxadodecene-1; 4,7-dimethyltridec-1-ene-9,10, 11,12-tetracarboxylic dianhydride; 4-butyltetradecadiene-1,5; (p - chloromercuriphenyl)pentadecene - 1; 7 - (4-nitrocyclohexyl)hexadecene - 1; 11 - (alpha - cumyl) heptadecene-1; 6-(para-isopropylphenyl)decene-1; 10-(2-norbornyl(nonadecene - 1; 6 - butyloctadecadiene-1,11; 8-t-butyl - 12-(2 - [4-dichloromethyltetrahydrofuryl])tetradecene-1; 7-phenyl - 10-(2-[6,6-dibromo - 3-oxabicyclo-(3.1.0)hexyl])docosene-1; 4 - methyloctene-1; 4-methylpentadecatetraene-1,4,7,12; diethyl 14-pentadecenylsuccinate; 8-diazomethylpentadecene-1; 9-carboxymethylpentadecene-1; 10-(2,3-diiodophenyl)decene-1; 10-(1,4-cyclohexadienyl)decene-1; 10-cyclopentyldecadiene-1,10; 4,7-diketo-10 - cyclooctyldecene-1; 4,5,6,7-tetrachloromethyloctene-1; 4,6,7-trinitromethyldecene-1; and 4,6,7-tri(phenoxymethyl)dodecene-1.

Mixtures of olefinically unsaturated compounds can also be employed. Suitable mixtures of olefinically unsaturated compounds are olefins obtained by the thermal cracking of wax and from the polymerization of ethylene.

The preparation of the carbonyl compounds can occur in a hydrochloric acid reaction medium or in any suitable solvent. It has been found that the conversion of the higher molecular weight unsaturated compounds as described above can be particularly improved by employing as a solvent any compound or mixture of compounds which possess relatively low olefin solubilizing properties and relatively high dielectric strength. Both properties are essential. Solvents having the requisite dielectric strength but which are outside the solubility limits to be described below, result in poor conversions as do solvents which have the requisite solubility but fail to meet the dielectric strength requirements. In particular, it has been found that a suitable solvent for the process of this invention comprises any compound or mixture of compounds which has a dielectric constant of at least 20 at 25° C. and which has solubility characteristics such that between 0.5 and 5.0 volumes of dodecene-1 are soluble at 25° C. in a mixture of 50 volumes of solvent and 7 volumes of water. It is preferred that the solvent be an organic compound or mixture of compounds liquid under reaction conditions, and which has a dielectric constant at 25° C. between 20 and 60 and more preferably a dielectric constant at 25° C. between 30 and 40, and which has solubility characteristics such that between 0.5 and 5.0 volumes of dodecene-1 are soluble at 25° C. in a mixture of 50 volumes of solvent and 7 volumes of water.

For a continuous process it is preferred that the solvent be an organic compound or mixture of compounds liquid under reaction conditions which has a dielectric constant of at least 20 at 25° C. and which has solubility characteristics such that between 0.5 and 1.5 volumes of dodecene-1 are soluble in a mixture of 50 volumes of solvent and 7 volumes of water. The most preferred solvent is methanol which is relatively inexpensive, stable, and results in excellent olefin conversions. Other suitable solvents include dimethylformamide, ethanol and dimethylacetamide. The suitability of any particular compound or mixture for use as a solvent can easily be determined by one skilled in the art by obtaining the dielectric constant of the compound at 25° C. and determining if the solubility characteristics are suitable by the simple test procedure outlined above.

The products from the reaction are carbonyl containing compounds which include ketones, aldehydes and organic acids. The principle product is the ketone and if an alpha-olefin is utilized as the charge material, a methyl ketone is almost exclusively the product obtained.

Materials such as mercaptans and amines which form stronger ligand bonds with the platinum group metal compound than does the olefin charge stock are, of course, unsuitable charge stock components and should suitably be removed.

The olefinically unsaturated charge stock can be added to the aqueous solution of the platinum group metal compound and the reaction solvent or, if desired, water can be added to the reaction mixture comprising the olefinically unsaturated compound and catalyst. This latter method of water addition is only suitable when the reaction solvent is an aprotic organic solvent which has a dielectric constant at 25° C. of at least 20. By an aprotic solvent is meant one which does not have a hydrogen atom directly connected to an oxygen atom. There is, therefore, an absence of hydroxyl groups in an aprotic solvent, that is, an aprotic solvent is free of hydroxyl groups. The solvent must be aprotic to insure that it will not react with the olefinically unsaturated charge stock in the presence of the platinum group metal catalyst to form compounds such as vinyl ethers and vinyl acetates before sufficient water is present in the reaction medium to promote the desired formation of the carbonyl containing compounds. The preferred aprotic solvents are those which have a dielectric constant at 25° C. between 20 and 60 and the more preferred aprotic solvents are those which have a dielectric constant at 25° C. between 30 and 50. The most preferred aprotic solvent is dimethylformamide, which has a dielectric constant at 25° C. of 37. Examples of other suitable aprotic solvents include dimethylsulfoxide and dimethylacetamide. The dielectric constants of these two materials at 25° C. are 45 and 37.8, respectively.

The process of the present invention can be carried out with a catalyst comprising a compound of a noble metal of Group VIII of the Periodic Table (a platinum group metal compound) which includes metals, such as ruthenium, rhodium, palladium, osmium, iridium and platinum. The preferred metal compounds are those of palladium and platinum. It is still more preferred to use the water soluble salts of palladium and platinum, such as the halides, sulfates or phosphates. The most preferred catalyst is palladium chloride. Suitable specific examples of catalysts which can be used either alone or in admixture to promote the process of the subject invention include platinum chloride, platinum sulfate, palladium acetate, palladium chloride and palladium sulfate.

The amount of the platinum group metal compound required to promote the subject reaction can vary over a wide range. When an aqueous solution of metal salts is employed and the olefinic charge stock is added to the aqueous catalyst solution, the weight percent of the platinum group metal compound based on the reaction mixture before the olefin is added can vary between 0.01 and 20 weight percent, and is preferably between 0.1 and 10 weight percent. The amount of the platinum group metal compound based on the olefinically unsaturated charge stock can vary between 0.1 and 50 weight percent, and is preferably between 1 and 25 weight percent.

In the subject process the platinum group metal compound is reduced while promoting the oxidation of the olefin by forming a complex with the olefinically unsaturated compound which then decomposes to form the platinum group metal and the carbonyl compound. The reduced platinum group metal compound is inactive to promote further oxidation until it is again in a proper oxidation state. It is preferred to also have present in the reaction mixture an oxidizing agent which, while not reacting with the olefinically unsaturated compound, the reaction solvent or the reaction products would be capable of oxidizing the platinum group metal compound to an active state. Thus, the platinum group metal compound could be used in stoichiometric quantities to produce the desired carbonyl compounds, but in order for the platinum group metal compound to function as a catalyst and not as a reactant, it must be re-oxidized to the proper valence state. In view of the expense of the platinum group metal compounds, the re-oxidation of the platinum group metal compound is the only practical means of operating the subject process. It is therefore preferred to have present in the reaction mixture an oxidizing agent which has an oxidation potential higher than that of the platinum group metal compound employed. The oxidation potential of any particular agent can be determined from the International Critical Tables or other literature sources, or by suitable known testing procedures.

It would be desirable, of course, to re-oxidize the platinum group metal with an oxidizing gas, such as oxygen, but this reaction does not occur readily. It has been found that certain organic compounds, for example the quinones, are suitable oxidizing agent. For example, ortho- and paraquinones, such as benzoquinone, naphthaquinones, anthraquinones, phenanthrenequinones, or the alkyl substitution products of such quinones or the sulfonic or carboxylic acid derivatives of said quinones can be employed, so long as the oxidation potential of the quinone is higher than that of the platinum group metal. Specific examples of suitable quinones includes 2-methyl-1,4-benzoquinone; 9,10 - phenanthrenequinone; 7-butylnaphthaquinone; anthraquinone - 1 - carboxylic acid; 1,2-naphthaquinone - 4 - sulfonic acid; 2,3,5,6 - tetrachloro-1,4-benzoquinone; and duroquinone.

Other organic oxidizing agents can also suitably be employed, such as the organic peroxides, organic halamides, organic halimides and organic hypohalites. Specific examples of suitable compounds include t-butyl hydroperoxide, cumene hydroperoxide, di-t-butyl peroxide, diacetyl peroxide, N - chloroacetamide, N - bromo succinimide, t-butylhypochlorite and trifluoroperacetic acid.

Inorganic oxidizing agents can also be employed. These include compounds such as ozone, hydrogen peroxide, sodium peroxide or compounds of the higher valence state of metals such as copper, iron, cobalt, nickel, manganese, chromium, lead, vanadium and others.

The organic oxidizing agents and many of the inorganic oxidizing agents are equally difficult to re-oxidize with an oxygen containing gas. It is consequently still further preferred to employ a redox system comprising an oxidizing agent which has an oxidation potential higher than that of the platinum group metal and an oxygen containing gas, said oxidizing agent being such that it is itself re-oxidized with an oxygen containing gas. A class of compounds which satisfy this criterion includes the compounds of copper, iron, cobalt, manganese and nickel. Particularly preferred are the halide derivatives of copper, and most preferred is copper chloride.

The amount or concentration of the oxidizing agent will vary depending, in part, on whether it is employed alone or as part of a redox system. In the case where the oxidizing agent is employed alone, such as where a quinone is used, the amount of oxidizing agent can vary between 1 and 50 weight percent of the total reaction mixture with preferred amounts between 5 and 25 weight percent.

Where a redox system is employed, the molar ratio of the sum of the redox metals to the platinum group metal is at least 1:10 and preferably between 1:1 and 100:1.

Water must also be present in the reaction system. The function of the water is to aid in solubilizing the platinum group metal compound and to provide the necessary oxygen to form the desired carbonyl containing compound from the decomposition of the platinum metal group compound-olefin complex. In general, the amount of water can vary between 1 and 50 weight percent of the reaction solvent with preferred concentrations between 2 and 30 weight percent. The most preferred concentrations will depend in part on the solvent employed. For example, when dimethylformamide is employed as the solvent, the preferred water concentration is between 5 and 20 weight percent. Too low a water concentration results in a slow reaction rate and a decreased selectivity to the desired carbonyl containing compound due to olefin isomerization. Too high a water concentration results in poor olefin solubility with the consequent low conversions.

When a redox system is employed which utilizes an oxygen containing gas to re-oxidize the redox metal, then any oxygen containing gas can suitably be employed, for example, air, oxygen, oxygen enriched air or air diluted with an inert gas, such as nitrogen. The rate of addition of the oxygen containing gas will depend, of course, on the oxygen content, but in general should be such as to substantially completely react while in the reaction zone. The preferred oxygen containing gases are those having an oxygen content between 5 and 100 weight percent and for these preferred oxygen containing gases the rate of addition is generally between 1 and 100 and preferably between 10 and 60 cubic feet per hour per cubic foot of reactor volume.

The subject process can be run in a semi-batch type reactor where the olefinically unsaturated charge stock is continuously added, and in those cases where desired, an oxygen containing gas is also continuously added. As noted above, the water can be added continuously to a reaction mixture comprising the olefinically unsaturated charge stock and catalyst when an aprotic solvent is employed. The subject process can also be run in a continuous manner. A continuous process is particularly desirable when the solvent which is employed has solubility characteristics such that between 0.5 and 1.5 volumes of dodecene-1 are soluble in a mixture of 50 parts by volume of the solvent and 7 parts by volume of water. A continuous process is particularly preferred when the above solvent is employed since the unreacted charge and product readily separate from the bulk of the catalyst-solvent mixture and can be continuously removed from an upper phase. There is always some catalyst carryover, however, since the catalysts employed are soluble in the reaction medium, and, it is believed the platinum group metal compounds form complexes with the unreacted olefinically unsaturated compounds or the carbonyl containing compounds in the product. It is believed the formation of these platinum complexes is the reason why the platinum group metal compound is not recoverable by extraction with aqueous hydrochloric acid.

As noted above, due to the expense of the platinum group metal compounds, it is particularly important in developing a commercially acceptable process to recover even minor amounts of these platinum group metal catalysts from the reaction product.

The invention will be further illustrated with reference to the following specific examples.

Example 1

A reaction mixture was prepared consisting of 0.02 mol (3.56 grams) of palladium chloride ($PdCl_2$); 0.02 mol (3.40 grams) of copper chloride ($CuCl_2 \cdot 2H_2O$); 10.0 grams of water; and 50 milliliters of methanol. Oxygen at the rate of 3.3 liters per hour was passed through the solution held at about 60° C. Dodecene-1 [0.2 mol (33.6 grams)] was added continuously over the 3.25 hour reaction period. Following complete addition of the olefin, the reaction mixture was stirred an additional 0.5 hour at 60°–70° C. The product separated into two phases and the upper phase comprising mostly ketone, some methanol, olefin and some complex compounds of copper and palladium was removed and extracted twice with 25.0 milliliter portions of 3 N HCl. The acidic extracts yielded about 0.31 gram of salts (0.22 gram of $PdCl_2$ and 0.09 gram of $CuCl_2 \cdot 2H_2O$).

The acid extracted product had an ash oxide content of 1.17 percent by weight indicating the presence of Pd in some form. Previous analysis on other HCl washed products showed substantially complete removal of the copper. The acid extracted product was passed, under $N_2$, downflow at a space velocity of 0.25 volume of liquid feed per volume of reactor space per hour through a column packed with 60 ml. of coarse quartz chips at a temperature of about 220° C. The recovered organic phase was essentially free of Pd (ash oxide 0.07 percent by weight) and the ketone was not destroyed by the treatment. The recovery of organic material was 99 percent. The Pd was found to have deposited on the quartz as the free metal.

The packed column was washed with an excess of pentane to remove the organic holdup, and the Pd was dissolved from the quartz by passage of aqua regia downflow through the bed at atmospheric conditions. Removal of the aqua regia left an amount of $PdCl_2$ equivalent to 0.48 gram removed from the product phase after the HCl wash.

Example 1 shows that some Pd and copper are removed from the reaction mixture with the product and must be recovered. Example 1 shows that about 19 percent of the original palladium passes into the product phase while converting 0.2 mol of 1-dodecene. Only about 31 percent of the Pd in the product phase can be recovered by extraction with HCl. The remaining 69 percent is recoverable by the process of this invention.

Example 2

A run similar to Example 1 was made and the product phase was passed directly downflow through the packed column of quartz chips at a space velocity of 0.25 volume of liquid feed per volume of reactor space per hour and a temperature of 220°–230° C. without a prior acid wash. The recovered organic phase had an ash oxide content of 0.00 percent indicating substantially complete removal of both the palladium and the copper.

Ketone products from runs similar to Example 1 were steam and vacuum distilled in unsuccessful attempts to purify the ketone products of the metal catalysts. The ketone products were also extracted with dimethylsulfoxide and treated with sodium hydroxide in unsuccessful attempts to separate substantially all of the metal catalyst from the ketone products.

Th advantages of the method of the subject invention include (1) ease of operation; (2) the separation of substantially all of the metal catalyst components from the organic reaction product; (3) recovery of the organic reaction product substantially unchanged; (4) maintenance of the packed bed in a relatively clean active condition even when polymerizable substances, such as olefins, are present in the organic reaction product by maintaining the reaction product in the liquid phase which serves as a wash liquid; and (5) ease of recovery and regeneration of the deposited metals from the packed bed.

Resort may be had to such variations and modifications as fall within the spirit of the invention and the scope of the appended claims.

We claim:

1. A process for the recovery of a platinum group metal substantially completely from a normally liquid organic reaction product comprising a soluble platinum group metal compound selected from the group consisting of sulfates, phosphates and halides which are partially extractable from the reaction product with an aqueous mineral acid which comprises contacting said organic reaction product with a solid inert material at a temperature of at least 125° C. but less than the decomposition temperature of said reaction product for a time sufficient to precipitate the platinum group metal as the free metal while maintaining said reaction product in the liquid phase.

2. A process for the recovery of a platinum group metal substantially completely from a normally liquid reaction product formed by the oxidation of an olefinically unsaturated compound having at least six carbon atoms per molecule and at least one hydrogen atom on each carbon atom of at least one olefinic double bond in the presence of a water soluble platinum group metal compound selected from the group consisting of sulfates, phosphates and halides which are partially extractable from the reaction product with an aqueous mineral acid which comprises contacting said reaction product with a solid inert material at a temperature of at least 125° C., but less than the decomposition temperature of said reaction product for a time sufficient to precipitate the platinum group metal as the free metal while maintaining said reaction product in the liquid phase.

3. A process in accordance with claim 2 wherein the platinum group metal is palladium.

4. A continuous process for the recovery of a platinum group metal substantially completely from a reaction product formed by continuously adding an oxygen containing gas and an olefinically unsaturated compound having at least 6 carbon atoms per molecule and at least one hydrogen atom on each carbon atom of at least one double bond to the lower phase of a reaction mixture comprising an aqueous solution of a compound of a metal of the platinum group, an oxidizing agent having an oxidation potential higher than that of the platinum group metal and a solvent which has a dielectric constant at 25° C. of at least 20 and is such that between 0.5 and 1.5 volumes of dodecene-1 are soluble at a temperature of 25° C. in a mixture of 50 volumes of solvent and 7 volumes of water, continuously removing an upper phase containing said reaction product comprising said solvent, carbonyl containing compounds and at least a portion of the platinum group metal compound, continuously contacting said upper phase with a solid inert material at a temperature of at least 125° C. but less than the decomposition temperature of said reaction product for a time sufficient to precipitate substantially all of said platinum group metal as the free metal on said solid inert material while maintaining the reaction product in the liquid phase.

5. A process according to claim 4 wherein said platinum group metal is palladium and said solvent is selected from the group consisting of methanol, ethanol, dimethylformamide and dimethylacetamide.

6. A process according to claim 5 wherein said olefinically unsaturated compound has between 6 and 20 carbon atoms per molecule.

7. A process according to claim 6 wherein said solvent is methanol and said olefinically unsaturated compound is dodecene-1.

8. A process according to claim 6 wherein the solid inert material is quartz chips, the temperature of contacting said upper phase is between 125° C. and 400° C. and the space velocity is between 0.01 and 40.0 volumes per volume per hour.

9. A process according to claim 4 wherein said oxidizing agent is a metal compound which has an oxidation potential higher than that of platinum group metal.

10. A process according to claim 8 wherein said metal compound is a soluble form of copper.

11. A process according to claim 8 wherein the olefinically unsaturated compound is an aliphatic alpha-olefin having between 6 and 20 carbon atoms per molecule.

12. A process for the recovery of a platinum group metal from a reaction product formed by the addition of water to a reaction mixture comprising an olefinically unsaturated compound having at least 6 carbon atoms per molecule and at least one hydrogen atom on each carbon atom of at least one olefinic double bond, a catalyst comprising a compound of a metal of the platinum group, a soluble organic oxidizing agent having an oxidation potential higher than that of the platinum group metal, and an aprotic organic solvent which has a dielectric constant at 25° C. of at least 20, which comprises contacting said reaction product with a solid inert material at a temperature of at least 125° C. but less than the decomposition temperature of said reaction product for a time sufficient to precipitate the platinum group metal as the free metal while maintaining said reaction product in the liquid phase.

13. A process for the recovery of a platinum group metal halide from a reaction product formed by the oxidation of an olefinically unsaturated compound having at least six carbon atoms per molecule and at least one hydrogen atom on each carbon atom of at least one olefinic double bond in the presence of a water soluble platinum group metal halide partially extractable from the reaction product with an aqueous mineral acid which comprises contacting said reaction product with a solid inert material at a temperature of at least 125° C., but less than the decomposition temperature of said reaction product for a time sufficient to precipitate the platinum group metal as the free metal while maintaining said reaction product in the liquid phase, and thereafter contacting said inert material with an acid halide corresponding to the desired metal halide and recovering said platinum group metal from said inert material.

14. A process according to claim 13 wherein said acid halide is aqua regia.

15. A continuous process for the recovery of a platinum group metal substantially completely from an oxidation reaction product formed by continuously adding an oxygen containing gas and an olefinically unsaturated compound having at least 6 carbon atoms per molecule and at least one hydrogen atom on each carbon atom of at least one double bond to the lower phase of a reaction mixture comprising an aqueous solution of a compound of a metal of the platinum group, an oxidizing agent having an oxidation potential higher than that of the platinum group metal and a solvent which has a dielectric constant at 25° C. of at least 20 and is such that between 0.5 and 1.5 volumes of dodecene-1 are soluble at a temperature of 25° C. in a mixture of 50 volumes of solvent and 7 volumes of water, continuously removing an upper phase containing said reaction product comprising said solvent, carbonyl containing compounds and at least a portion of the platinum group metal compound, continuously contacting said upper phase with a solid inert material at a temperature of at least 125° C. but less than the decomposition temperature of said reaction product for a time sufficient to precipitate substantially all of said platinum group metal as the free metal on said solid inert material while maintaining the reaction product in the liquid phase, thereafter contacting said inert material with elemental chlorine to convert the platinum group metal to the platinum group metal chloride, leaching the platinum group metal chloride from said inert material with a solvent corresponding to the solvent used in said oxidation reaction, and recycling said solvent-platinum group metal chloride mixture to said oxidation reaction.

16. A process according to claim 15 wherein said solvent is methanol.

References Cited by the Examiner

UNITED STATES PATENTS

| | | | |
|---|---|---|---|
| 1,848,723 | 3/1932 | Jaeger | 252—415 X |
| 2,721,136 | 10/1955 | Carter | 260—597 X |
| 2,747,986 | 5/1956 | Gwynn et al. | 75—28 |
| 2,828,200 | 3/1958 | Nixon | 75—83 |
| 3,016,354 | 1/1962 | Hinden et al. | 252—415 X |
| 3,119,875 | 1/1964 | Steinmetz et al. | 260—604 |
| 3,122,586 | 2/1964 | Berndt et al. | 252—411 X |
| 3,129,253 | 4/1964 | Odioso et al. | 260—597 X |
| 3,154,586 | 10/1964 | Bander et al. | 252—411 X |
| 3,188,299 | 6/1965 | Chalk | 252—430 X |
| 3,210,152 | 10/1965 | van Heldent et al. | 252—415 X |

DAVID L. RECK, *Primary Examiner.*

HYLAND BIZOT, H. W. TARRING,
*Assistant Examiners.*